United States Patent

[11] 3,616,207

[72] Inventors: Masahiko Yoneda, Suita; Akira Imada, Nishinomiya, both of Japan
[21] Appl. No.: 604,607
[22] Filed: Dec. 27, 1966
[45] Patented: Oct. 26, 1971
[73] Assignee: Takeda Chemical Industries, Ltd. Osaka, Japan
[32] Priority: Dec. 28, 1965
[33] Japan
[31] 40/81389

[52] U.S. Cl. .................................................. 195/28 N, 195/100
[51] Int. Cl. .................................................. C12d 13/06
[50] Field of Search .................................... 195/28 N

[56] References Cited
UNITED STATES PATENTS
3,111,459  11/1963  Motozaki et al. ............... 195/28 N Primary Examiner—Alvin E. Tanenholtz
Attorney—Wenderoth, Lind & Ponack

[54] METHOD FOR THE PRODUCTION OF 5'-INOSINIC ACID AND INOSINE
9 Claims, No Drawings ABSTRACT: 5'-inosinic acid and/or inosine are(is) produced by incubating adenine-, amino acid- or/and vitamin- double or triple requiring mutants derived from *Bacillus licheniformis*, in a culture medium containing an adenine source and an amino acid source and/or a vitamin source.

METHOD FOR THE PRODUCTION OF 5'-INOSINIC ACID AND INOSINE

This invention relates to a method for the production of 5'-inosinic acid (hereinafter referred to as 5'-IMP) and/or inosine. More particularly, this invention relates to a method for the production of 5'-IMP, inosine or a mixture of 5'-IMP and inosine, which comprises inoculating a mutant, which is derived from a micro-organism belonging to *Bacillus licheniformis* and which requires for its growth both (1) adenine and (2) at least one of amino acid and vitamin, onto a culture medium containing the adenine source and at least one of the amino acid source and the vitamin source, incubating the culture medium until the desired substance is accumulated therein, and recovering the desired substance thus accumulated from the culture medium.

According to the present invention, the incubation of certain mutants derived from micro-organisms belonging to *Bacillus licheniformis* brings about accumulation of 5'-IMP and/or inosine in a remarkably large amount in the culture medium, and the 5'-IMP and inosine accumulated in this way are easily recoverable from the culture medium. The said mutants cannot grow on a minimal culture medium such as that mentioned in table 1 (infra) on which wild-type strains of the mutants can grow, but they can grow on a culture medium prepared by the addition to the minimal culture medium of both (1) an adenine source and (2) an amino acid source such as amino acid itself, e.g., histidine, methionine, phenylalanine, tryptophane, aspartic acid, lysine, threonine, valine, alanine, leucine, and/or vitamin source containing water-soluble vitamins such as vitamin $B_1$, $B_2$, $B_6$, $B_{12}$, nicotinic acid amide, folic acid, nicotinic acid and pantothenic acid; in other words, the mutants require (1) adenine and (2) amino acid and/or vitamin for their growth.

TABLE 1

(Minimal Culture Medium)

| | |
|---|---|
| glucose | 10.0 grams |
| $(NH_4)_2SO_4$ | 5.0 grams |
| $K_2HPO_4$ | 3.0 grams |
| $KH_2PO_4$ | 1.0 gram |
| $Na_2SO_4$ | 1.0 gram |
| $MgSO_4$ | 0.2 gram |
| ferric citrate | 0.1 gram |
| distilled water | up to 1 liter |
| | pH 7.0 |

The object of this invention is to provide a method for preparing 5'-IMP and/or inosine, which can be efficiently put into practice on an industrial scale with a good yield. This object is realized by inoculating a mutant requiring (1) adenine and (2) amino acid and/or vitamin, of *Bacillus licheniformis* in a culture medium containing both (1) an adenine source and (2) an amino acid source and/or a vitamin source, and incubating the culture medium. (Hereinafter the mutant mentioned above is referred to as "adenine- and amino acid- and/or vitamin-requiring mutant(s) of this invention.")

Adenine- and amino acid- and/or vitamin-requiring mutants of this invention are derived by means of a per se conventional technique for the mutation of micro-organisms. More concretely stated, wild-type micro-organisms belonging to *Bacillus licheniformis* are treated, for example, with ultraviolet light, X-rays nitrogen mustard, nitrous acid, etc. Employment of a spontaneously derived adenine- and amino acid- and/or vitamin-requiring mutant of a micro-organism belonging to *Bacillus licheniformis* is also within the scope of this invention.

Adenine- and amino acid- and/or vitamin-requiring mutants of this invention are, for example, *Bacillus licheniformis* No. L-129(ATCC 21037), *Bacillus licheniformis* No. L-065 (ATCC 21038) and *Bacillus licheniformis* No. L-271 (ATCC 21039).

For the purpose of the industrial production of 5'-IMP and/or inosine by incubating adenine- and amino acid- and/or vitamin-requiring mutant of this invention, it is in general preferable to use a liquid culture medium. The incubation is carried out generally either under static conditions or as a submerged process under aeration and/or agitation, employing a culture medium necessarily containing both (1) an adenine source and (2) an amino acid source and/or a vitamin source as well as assimilable carbon source(s) and digestible nitrogen source(s).

As the adenine source, there may be exemplified adenine itself, a compound which contains adenine component in its molecule and is easily convertible into adenine, or a natural substance containing the latter compound. For example, there may be employed adenine, adenosine, 3'-adenylic acid, meat extract, cornsteep liquor, polypeptone, and yeast extract.

As the amino acid source, there may be employed amino acid such as histidine, methionine, phenylalanine, tryptophane, aspartic acid, lysine, threonine, valine, alanine, leucine; peptide; or a natural substance containing such an amino acid as above and/or peptide such as casein hydrolysate, meat extract, polypeptone and yeast extract.

As vitamin source, there may be employed water-soluble vitamin such as vitamin $B_1$, $B_2$, $B_6$, $B_{12}$, nicotinic acid, nicotinic acid amide, folic acid, pantothenic acid and biotin, a vitamin mixture containing said water-soluble vitamins, or natural substances containing said vitamin, such as yeast extract, polypeptone, etc.

Natural substances containing an adenine source as well as amino acid source and a vitamin source, e.g., soybean meal, meat extract, yeast extract, polypeptone, etc. are also generally employable.

Adenine and amino acid sources and/or a vitamin source should be added to the culture medium in a sufficient amount for the growth of the adenine- and amino acid- and/or vitamin-requiring mutants of this invention. Generally, an adenine source is added to the culture medium so as to make its concentration from about 10 mg./l. (milligrams per liter) to about 1g/l. when calculated in terms of adenine. The amino acid source is preferably added to the culture medium so as to make its concentration from about 20 mg./l. to about 500 mg./l. when calculated in terms of the amino acid itself. The vitamin source is preferably added to the culture medium so as to make its concentration from about 1 mg./l. to about 50 mg./l. when calculated in terms of the vitamin itself.

As the assimilable carbon source, one or more of the compounds, e.g., starch, dextrin, sucrose, lactose, maltose, glucose, glycerol, etc. may be used, and various organic compounds or organic materials such as organic ammonium slats, organic nitrates, urea, etc. may be used not only as the carbon source but also as the digestible nitrogen source in the same way as inorganic nitrogen source, for example, inorganic ammonium salts such as ammonium sulfate, ammonium carbonate, ammonium phosphate, or various kinds of nitrates such as sodium nitrate, potassium nitrate, etc. Furthermore, a small quantity of inorganic salts such as sodium chloride, phosphates, salts of metals such as calcium, zinc, manganese, iron may be added to the medium.

Especially desirably, the medium may contain a calcium salt of phosphoric acid (i.e., calcium primary phosphate, calcium secondary phosphate, calcium tertiary phosphate or a mixture thereof), because a large amount of 5'-IMP or/and inosine is(are) accumulated in the medium when adenine- and amino acid- and/or vitamin-requiring mutants of this invention are incubated in such medium, as compared with the incubation in an ordinary culture medium. The calcium salt of phosphoric acid may be added to the medium employed in the method of this invention as the sole phosphate source or may be used together with ordinary phosphate source. The optimum concentration of the calcium salt of phosphoric acid in the culture medium is about 0.2 percent to about 5.0 percent (weight/volume), from the viewpoint of the yield of the objective substance to be accumulated in the medium.

Incubation conditions such as the pH of the medium and the incubation temperature should be controlled so as to accumulate the desired substance(s) in the maximum amount. Generally, the initial pH of the culture medium and the incubation temperature are respectively adjusted to 6.5 to 8.5 and to 20° to 45° C., preferably 25° to 37° C.

Under the above-mentioned culture conditions, the desired substance(s) is, or are, produced and accumulated in the culture medium with the lapse of time.

Incubation is continued until the maximum amount of the desired substance(s) is, or are, accumulated in the culture medium. Although the period required for the maximum accumulation of 5'-IMP and/or inosine is changeable depending upon various factors, generally the amount of the desired substance(s) which has, or have, accumulated in the culture medium reaches a maximum usually between the 2nd day to 10th day from the start of the incubation.

5'-IMP and/or inosine accumulated in the culture medium are recovered respectively or in admixture in a free state or in a state of the corresponding salt such as disodium salt, dipotassium salt by simple procedures, e.g., those employing activated charcoal or anion exchange resin.

Following examples are merely intended to illustrate presently preferred embodiments of this invention and not to restrict the scope thereof.

In the present specification as well as in the following examples, the abbreviations cm., mg., g., ml., l. and °C. refer respectively to centimeters, milligram(s), gram(s), milliliter(s), liter(s) and degrees centigrade.

EXAMPLE 1

Adenine- and histidine- double requiring mutant, *Bacillus licheniformis* No. L-129 (ATCC 21037), is derived from *Bacillus licheniformis* (NCIB 8537) by subjecting it twice to a series of treatments, i.e., irradiation of ultraviolet light (15 watt) for 5 minutes from a height of 50 cm., penicillin screening [Experientia 66, 41 (1960)] and replica plating [Journal of Bacteriology 63, 399 (1952)].

Thus obtained *Bacillus licheniformis* No. L-129 (ATCC 21037) is inoculated on 150 ml. of the culture medium mentioned below as table 2, followed by incubation under shaking at 28° C. for 20 hours.

TABLE 2

| | |
|---|---|
| glucose | 60 g. |
| dried yeast | 10 g. |
| (NH₄)₂SO₄ | 1 g. |
| CaCO₃ | 20 g. |
| adenine | 20 mg. |
| histidine | 10 mg. |
| calcium primary phosphate | 3 g. |
| calcium tertiary phosphate | 7 g. |
| cornsteep liquor | 5 g. |
| water | up to 1 liter, 7.5 |

The resultant culture broth is inoculated on 30 l. of the culture medium mentioned below as table 3, and the medium is incubated with aeration and agitation at 28° C. for 96 hours, whereby 6.20 mg./ml. of inosine and 2.54 mg./ml. of 5'-IMP are accumulated.

After being adjusted to pH 2.0, the culture broth is subjected to filtration. From the resultant filtrate, 150 g. of crystals of inosine and 58 g. of crystals of 5'-IMP are recovered by conventional treatment with activated charcoal and subsequently with strongly basic anion exchange resin (formic acid type of Dowex 1×8, Dow Chemical Co., U.S.A.).

TABLE 3

| | |
|---|---|
| dried yeast | 10 g. |
| (NH₄)₂SO₄ | 10 g. |
| calcium secondary phosphate | 5 g. |
| calcium tertiary phosphate | 5 g. |
| CaCO₃ | 20 g. |
| glucose | 50 g. |
| water | up to 1 liter, pH 7.5 |

EXAMPLE 2

Adenine- and tryptophane- double requiring mutant, *Bacillus licheniformis* No. L-065 (ATCC 21038), is derived from *Bacillus licheniformis* (NCIB 8537) by subjecting it twice to a series of treatments, i.e., X-ray irradiation (50,000 roentgen), penicillin screening (described above) and replica plating (described above).

Thus obtained *Bacillus licheniformis* No. L-065 (ATCC 21038) is inoculated on 150 ml. of the culture medium of the same composition as described in table 2 of example 1 except that the histidine is replaced by 20 mg./l. of tryptophane, and the medium is incubated under shaking at 32° C. for 20 hours.

The resultant culture broth is inoculated on 30 l. of the culture medium mentioned below as table 4, and the medium is incubated with aeration and agitation at 32° C. for 72 hours, whereby 11.40 mg./ml. of inosine is accumulated.

After being adjusted to pH 2,5, the culture broth is subjected to filtration. From the resultant filtrate, 250 g. of crystals of inosine are recovered by conventional treatment with activated charcoal.

TABLE 4

| | |
|---|---|
| glucose | 100 g. |
| yeast extract | 20 g. |
| polypeptone | 20 g. |
| K₂HPO₄ | 7 g. |
| KH₂PO₄ | 3 g. |
| sodium citrate | 0.5 g. |
| (NH₄)₂SO₄ | 0.1 g. |
| MgSO₄.7H₂O | 0.1 g. |
| water | up to 1 liter, pH 7.2 |

In the process of this example, when the incubation process is carried out in the culture medium containing 3 g./l. of calcium secondary phosphate and 7 g./l. of calcium tertiary phosphate in place of 5 g./l. of K₂HKPO₄ and 3 g./l. of KH₂PO₄, an enhanced amount, i.e., 14.0 mg./ml., of inosine is accumulated.

EXAMPLE 3

Adenine-, phenylalanine- and biotin- triple requiring mutant, *Bacillus licheniformis* No. L-271 (ATCC 21039), is derived from *Bacillus licheniformis* (NCIB 8537) by subjecting it twice to a series of treatments, i.e., ultraviolet light irradiation (15 watt) for 3 minutes from a height of 50 cm. followed by penicillin screening (described above) and replica plating (described above).

Thus obtained *Bacillus licheniformis* No. L-271 (ATCC 21039) is inoculated on 500 ml. of the culture medium mentioned below as table 5, and the medium is incubated under shaking at 28° C. for 16 hours.

TABLE 5

| | |
|---|---|
| glycerol | 20 g. |
| casein | 5 g. |
| cornsteep liquor | 10 g. |
| KH₂PO₄ | 1 g. |
| K₂HPO₄ | 3 g. |
| adenine | 50 mg. |
| water | up to 1 liter, pH 7.5 |

The resultant culture broth is inoculated on 50 l. of the culture medium mentioned below as table 6, and the medium is incubated with aeration and agitation at 28° C. for 120 hours, whereby 3.0 mg./ml. of inosine is accumulated.

After being adjusted to pH 2.0, the culture broth is subjected to filtration. From the resultant filtrate, 98 g. of crystals of 5'-IMP are recovered by conventional treatment with activated charcoal and subsequently with strong basic anion exchange resin (formic acid type of Dowex 1×8, Dow Chemical Co., U.S.A.).

TABLE 6

| | |
|---|---|
| glucose | 50 g. |
| polypeptone | 5 g. |
| yeast extract | 5 g. |
| $(NH_4)_2SO_4$ | 10 g. |
| calcium secondary phosphate | 5 g. |
| calcium tertiary phosphate | 5 g. |
| KCl | 1 g. |
| $MgSO_4 \cdot 7H_2O$ | 0.5 g. |
| water | up to 1 liter, pH 7.2 |

What is claimed is:

1. A method of producing 5'-inosinic acid, inosine or a mixture thereof, which comprises inoculating a mutant, which is derived from a micro-organism belonging to *Bacillus licheniformis* and which requires both (1) adenine and (2) at least one of amino acid and water-soluble vitamin, onto a culture medium containing the adenine source and at least one of the amino acid source and the water-soluble vitamin source, incubating the culture medium until objective substance is accumulated therein, and recovering the desired substance from the culture medium.

2. A method according to claim 1, wherein the mutant is incubated in the culture medium at a temperature of from about 20° to about 45° C. under aerobic conditions.

3. A method according to claim 2, wherein the mutant is incubated at a temperature of from about 25° to about 37° C.

4. A method according to claim 2, wherein the culture medium contains a calcium salt of phosphoric acid selected from the group consisting of calcium primary phosphate, calcium secondary phosphate, calcium tertiary phosphate and a mixture thereof.

5. A method according to claim 4, wherein the culture medium contains about 0.2 percent to about 5.0 percent (weight/volume) of the calcium salt of phosphoric acid.

6. A method according to claim 2, wherein the mutant is *Bacillus licheniformis* No. L-129 (ATCC 21037).

7. A method according to claim 2, wherein the mutant is *Bacillus licheniformis* No. L-065 (ATCC 21038).

8. A method according to claim 2, wherein the mutant is *Bacillus licheniformis* No. L-271 (ATCC 21039).

9. In a method for producing 5'-inosinic acid, inosine or a mixture thereof by inoculating a micro-organism onto a nutrient medium, incubating the inoculated medium until objective substance is accumulated therein, and recovering thus accumulated substance, the improvement according to which the micro-organism is a *Bacillus licheniformis* mutant which requires both (1) adenine and (2) amino acid and/or water-soluble vitamin, and the nutrient medium contains (1) adenine source and (2) amino acid source and/or water-soluble vitamin source.